United States Patent
Lindahl et al.

(10) Patent No.: US 8,600,743 B2
(45) Date of Patent: Dec. 3, 2013

(54) NOISE PROFILE DETERMINATION FOR VOICE-RELATED FEATURE

(75) Inventors: Aram Lindahl, Menlo Park, CA (US); Joseph M. Williams, Dallas, TX (US); Gints Valdis Klimanis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 783 days.

(21) Appl. No.: 12/683,203

(22) Filed: Jan. 6, 2010

(65) Prior Publication Data

US 2011/0166856 A1    Jul. 7, 2011

(51) Int. Cl.
*G10L 15/20* (2006.01)
(52) U.S. Cl.
USPC ............... 704/233; 704/235; 704/255
(58) Field of Classification Search
USPC ......... 704/233, 226, 208, 210, 214, 215, 235, 704/246, 250, 255, 257; 379/406.05; 381/94.2
See application file for complete search history.

(56) References Cited

U.S. PATENT DOCUMENTS

| | | | |
|---|---|---|---|
| 3,704,345 A | 11/1972 | Coker et al. | |
| 3,828,132 A | 8/1974 | Flanagan et al. | |
| 3,979,557 A | 9/1976 | Schulman et al. | |
| 4,278,838 A | 7/1981 | Antonov | |
| 4,282,405 A | 8/1981 | Taguchi | |
| 4,310,721 A | 1/1982 | Manley et al. | |
| 4,348,553 A | 9/1982 | Baker et al. | |
| 4,653,021 A | 3/1987 | Takagi | |
| 4,688,195 A | 8/1987 | Thompson et al. | |
| 4,692,941 A | 9/1987 | Jacks et al. | |
| 4,718,094 A | 1/1988 | Bahl et al. | |
| 4,724,542 A | 2/1988 | Williford | |
| 4,726,065 A | 2/1988 | Froessl | |
| 4,727,354 A | 2/1988 | Lindsay | |
| 4,776,016 A | 10/1988 | Hansen | |
| 4,783,807 A | 11/1988 | Marley | |
| 4,811,243 A | 3/1989 | Racine | |
| 4,819,271 A | 4/1989 | Bahl et al. | |
| 4,827,520 A | 5/1989 | Zeinstra | |
| 4,829,576 A | 5/1989 | Porter | |

(Continued)

FOREIGN PATENT DOCUMENTS

DE    3837590 A1    5/1990
DE    198 41 541 B4    12/2007

(Continued)

OTHER PUBLICATIONS

Alfred App, 2011, http://www.alfredapp.com/, 5 pages.

(Continued)

*Primary Examiner* — Huyen X. Vo
(74) *Attorney, Agent, or Firm* — Morgan, Lewis & Bockius LLP

(57) ABSTRACT

Systems, methods, and devices for noise profile determination for a voice-related feature of an electronic device are provided. In one example, an electronic device capable of such noise profile determination may include a microphone and data processing circuitry. When a voice-related feature of the electronic device is not in use, the microphone may obtain ambient sounds. The data processing circuitry may determine a noise profile based at least in part on the obtained ambient sounds. The noise profile may enable the data processing circuitry to at least partially filter other ambient sounds obtained when the voice-related feature of the electronic device is in use.

15 Claims, 12 Drawing Sheets

(56) References Cited

U.S. PATENT DOCUMENTS

| | | |
|---|---|---|
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,944,013 A | 7/1990 | Gouvianakis et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,424,947 A | 6/1995 | Nagao et al. |
| 5,434,777 A | 7/1995 | Luciw |
| 5,455,888 A | 10/1995 | Iyengar et al. |
| 5,469,529 A | 11/1995 | Bimbot et al. |
| 5,475,587 A | 12/1995 | Anick et al. |
| 5,479,488 A | 12/1995 | Lenning et al. |
| 5,491,772 A | 2/1996 | Hardwick et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,574,823 A | 11/1996 | Hassanein et al. |
| 5,577,241 A | 11/1996 | Spencer |
| 5,579,436 A | 11/1996 | Chou et al. |
| 5,581,655 A | 12/1996 | Cohen et al. |
| 5,596,676 A | 1/1997 | Swaminathan et al. |
| 5,608,624 A | 3/1997 | Luciw |
| 5,613,036 A | 3/1997 | Strong |
| 5,617,507 A | 4/1997 | Lee et al. |
| 5,621,859 A | 4/1997 | Schwartz et al. |
| 5,642,464 A | 6/1997 | Yue et al. |
| 5,642,519 A | 6/1997 | Martin |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,712,957 A | 1/1998 | Waibel et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,748,974 A | 5/1998 | Johnson |
| 5,790,978 A | 8/1998 | Olive et al. |
| 5,794,050 A | 8/1998 | Dahlgren et al. |
| 5,794,182 A | 8/1998 | Manduchi et al. |
| 5,799,276 A | 8/1998 | Komissarchik et al. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,860,063 A | 1/1999 | Gorin et al. |
| 5,864,806 A | 1/1999 | Mokbel et al. |
| 5,867,799 A | 2/1999 | Lang et al. |
| 5,873,056 A | 2/1999 | Liddy et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,943,429 A * | 8/1999 | Handel ........................ 381/94.2 |
| 5,943,670 A | 8/1999 | Prager |
| 5,970,446 A * | 10/1999 | Goldberg et al. ............. 704/233 |
| 5,987,404 A | 11/1999 | Della Pietra et al. |
| 6,016,471 A | 1/2000 | Kuhn et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,064,960 A | 5/2000 | Bellegarda et al. |
| 6,070,140 A | 5/2000 | Tran |
| 6,081,750 A | 6/2000 | Hoffberg et al. |
| 6,088,731 A | 7/2000 | Kiraly et al. |
| 6,108,627 A | 8/2000 | Sabourin |
| 6,122,616 A | 9/2000 | Henton |
| 6,144,938 A | 11/2000 | Surace et al. |
| 6,173,261 B1 | 1/2001 | Arai et al. |
| 6,188,999 B1 | 2/2001 | Moody |
| 6,195,641 B1 | 2/2001 | Loring et al. |
| 6,208,971 B1 | 3/2001 | Bellegarda et al. |
| 6,233,559 B1 | 5/2001 | Balakrishnan |
| 6,246,981 B1 | 6/2001 | Papineni et al. |
| 6,266,637 B1 | 7/2001 | Donovan et al. |
| 6,285,786 B1 | 9/2001 | Seni et al. |
| 6,308,149 B1 | 10/2001 | Gaussier et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,324,502 B1 * | 11/2001 | Handel et al. .................. 704/226 |
| 6,334,103 B1 | 12/2001 | Surace et al. |
| 6,356,854 B1 | 3/2002 | Schubert et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,453,292 B2 | 9/2002 | Ramaswamy et al. |

(56) References Cited

U.S. PATENT DOCUMENTS

| | | |
|---|---|---|
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,532,446 B1 | 3/2003 | King |
| 6,553,344 B2 | 4/2003 | Bellegarda et al. |
| 6,598,039 B1 | 7/2003 | Livowsky |
| 6,601,026 B2 | 7/2003 | Appelt et al. |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,778,951 B1 | 8/2004 | Contractor |
| 6,778,952 B2 | 8/2004 | Bellegarda |
| 6,778,962 B1 | 8/2004 | Kasai et al. |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,912,499 B1 | 6/2005 | Sabourin et al. |
| 6,928,614 B1 | 8/2005 | Everhart |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,451,081 B1 | 11/2008 | Gajic et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |

(56) References Cited

U.S. PATENT DOCUMENTS

| | | |
|---|---|---|
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,873,519 B2 | 1/2011 | Bennett |
| 7,873,654 B2 | 1/2011 | Bernard |
| 7,881,936 B2 | 2/2011 | Longé et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,121,837 B2 * | 2/2012 | Agapi et al. ................. 704/233 |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,300,801 B2 * | 10/2012 | Sweeney et al. ......... 379/406.05 |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,447,612 B2 | 5/2013 | Gazdzinski |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2004/0135701 A1 | 7/2004 | Yasuda et al. |
| 2005/0071332 A1 | 3/2005 | Ortega et al. |
| 2005/0080620 A1 | 4/2005 | Rao et al. |
| 2005/0080625 A1 | 4/2005 | Bennett et al. |
| 2005/0119897 A1 | 6/2005 | Bennett et al. |
| 2005/0143972 A1 | 6/2005 | Gopalakrishnan et al. |
| 2005/0182629 A1 | 8/2005 | Coorman et al. |
| 2005/0196733 A1 | 9/2005 | Budra et al. |
| 2006/0018492 A1 | 1/2006 | Chiu et al. |
| 2006/0122834 A1 | 6/2006 | Bennett |
| 2006/0143007 A1 | 6/2006 | Koh et al. |
| 2007/0055508 A1 * | 3/2007 | Zhao et al. ................... 704/226 |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0118377 A1 | 5/2007 | Badino et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2009/0006100 A1 | 1/2009 | Badger et al. |
| 2009/0006343 A1 | 1/2009 | Platt et al. |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0187402 A1 | 7/2009 | Scholl |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |

(56) References Cited

U.S. PATENT DOCUMENTS

| | | |
|---|---|---|
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0271676 A1 | 10/2012 | Aravamudan et al. |
| 2012/0311583 A1 | 12/2012 | Gruber et al. |

FOREIGN PATENT DOCUMENTS

| | | |
|---|---|---|
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 1245023 A1 | 10/2002 |
| GB | 2352377 A | 1/2001 |
| JP | 06 019965 | 1/1994 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | WO 2006/129967 A1 | 12/2006 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, J:., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

(56) References Cited

OTHER PUBLICATIONS

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int=l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

(56) References Cited

OTHER PUBLICATIONS

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http://www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages. (Thomas Robert Gruber).

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc.* v. *West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, ©1994 IEEE, 9 pages.

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of the Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

(56) References Cited

OTHER PUBLICATIONS

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris- France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of A Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.

(56) References Cited

OTHER PUBLICATIONS

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L., et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

(56) References Cited

OTHER PUBLICATIONS

Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone—Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).
International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).

* cited by examiner

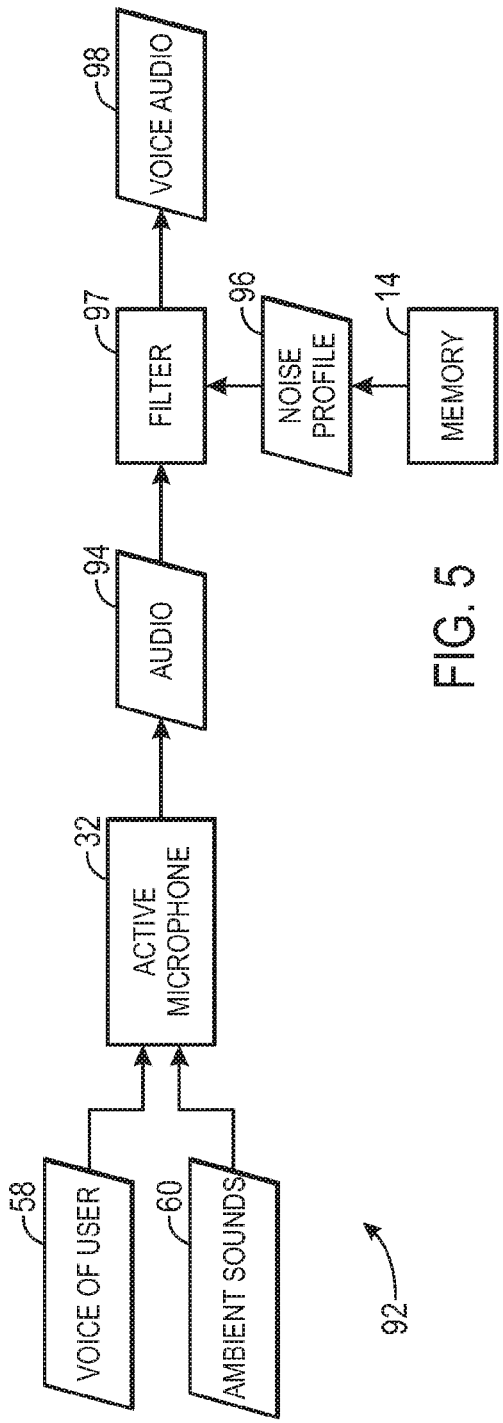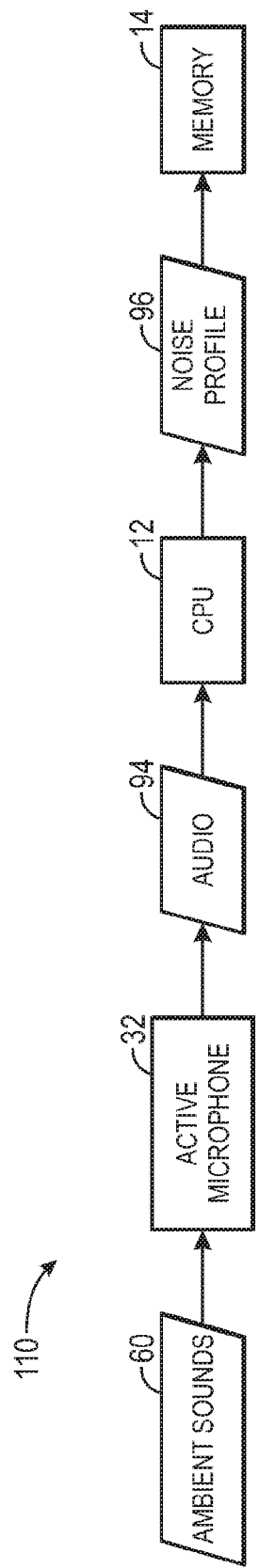

NOISE PROFILE DETERMINATION FOR VOICE-RELATED FEATURE

BACKGROUND

The present disclosure relates generally to techniques for noise cancellation and, more particularly, for preemptive noise convergence for noise cancellation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices employ voice-related features that involve recording and/or analyzing a user's voice. Voice recognition features, for example, may analyze a voice command spoken by a user to perform a task related to the command. Similarly, voice note recording features may record voice notes spoken by the user. However, when a user speaks into a microphone of an electronic device, ambient sounds, or background noise, may be obtained by the microphone at the same time. These ambient sounds may obscure the user's voice and, in some cases, may impede the proper functioning of a voice-related feature of the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for noise profile determination for a voice-related feature of an electronic device. In one example, an electronic device capable of such noise profile determination may include a microphone and data processing circuitry. When a voice-related feature of the electronic device is not in use, the microphone may obtain ambient sounds. The data processing circuitry may determine a noise profile based at least in part on the obtained ambient sounds. The noise profile may enable the data processing circuitry to at least partially filter other ambient sounds obtained when the voice-related feature of the electronic device is in use.

BRIEF DESCRIPTION OF THE DRAWINGS

Various aspects of this disclosure may be better understood upon reading the following detailed description and upon reference to the drawings in which:

FIG. 5 is a flow diagram illustrating a manner of performing the method of FIG. 4, in accordance with an embodiment;

FIG. 7 is a flow diagram representing a manner of performing the method of FIG. 6, in accordance with an embodiment;

DETAILED DESCRIPTION OF SPECIFIC EMBODIMENTS

Figure 1:
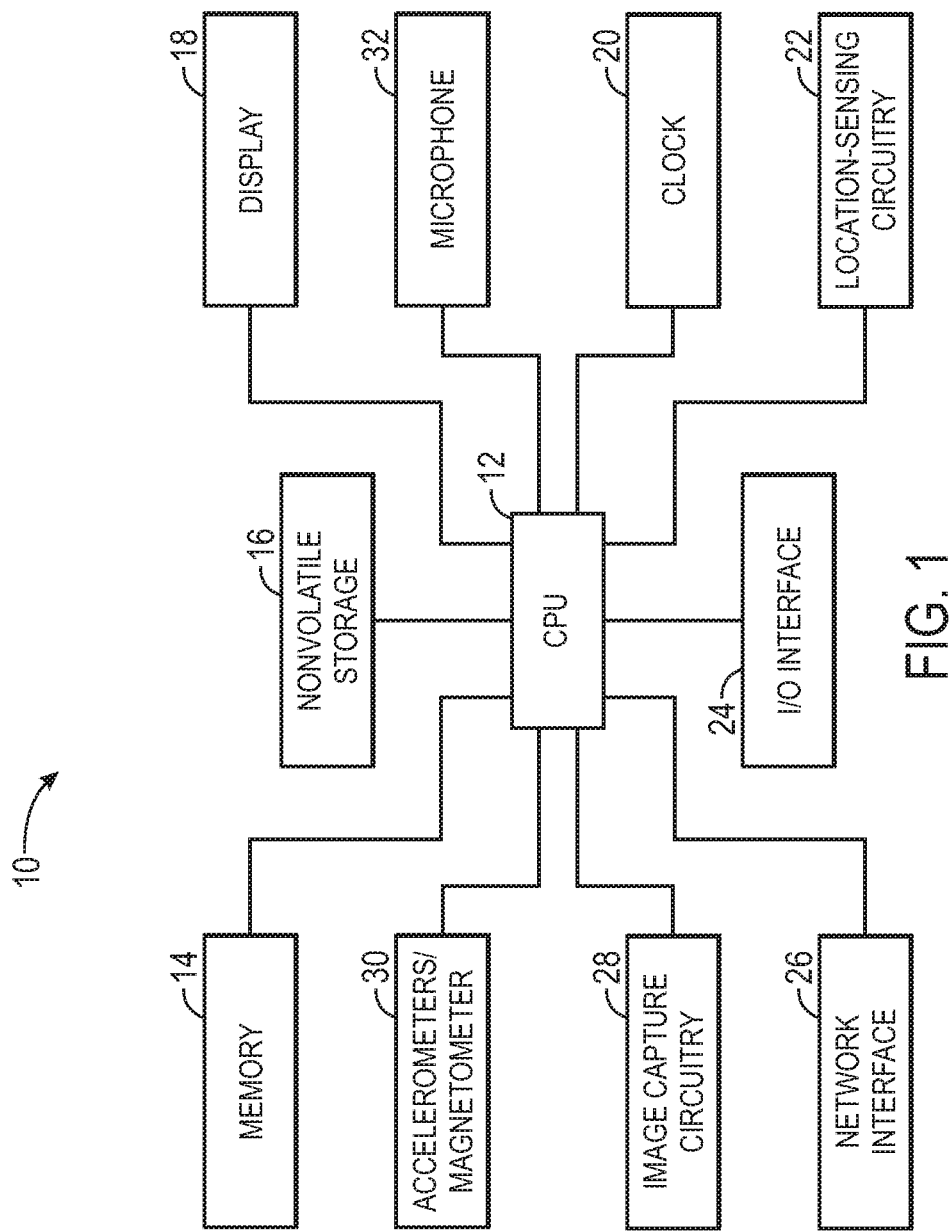
FIG. 1 is a block diagram of an electronic device capable of performing the techniques disclosed herein, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to techniques for determining a noise profile for voice cancellation used in combination with voice-related features of electronic devices. As used herein, the term "noise profile" generally may refer to information relating to noise in a signal, such as ambient sounds in an audio signal, which may be employed to exclude such noise from another signal. For example, using the techniques described herein, a noise profile may be employed to filter ambient sounds from a voice command for a voice recognition feature, to isolate a user's voice for recording voice notes, to isolate a subject's voice for recording video, to enhance the quality of sound for a telephone feature, and so forth. Rather than attempt to identify noise at the time when a user activates or uses such a voice-related feature, the electronic device may remove ambient sounds using a noise profile developed from a prior recording of ambient sounds. As used herein, the term "voice-related feature" may refer to any functionality of an electronic device, which may be implemented in hardware or software, that may at least partially filter ambient sounds from an audio signal that may include voice audio and the ambient sounds. Among other things, such a voice-related feature may include voice recognition software that may receive voice commands from a user and, after filtering away ambient sounds, may perform various tasks based on the voice command. By way of example, voice recognition software may include the Voice Control application by Apple Inc.

In particular, because attempting to identify noise after a user has begun to speak may result in delays or a misidentification of ambient noise, an electronic device employing the techniques disclosed herein may periodically sample ambient sounds and construct a noise profile based on such ambient sounds when the voice-related feature is not in use. Additionally or alternatively, the electronic device may sample ambient sounds based on a stimulus (e.g., activation of a non-voice-related feature, initialization of the electronic device, navigation to the voice-related feature, a change in the context of use of the electronic device, and/or when another person is speaking on a telephone feature of the electronic device). Moreover, in some embodiments, the electronic device may assess a current context of use of the electronic device at the time the ambient sounds are sampled and when the noise profile is subsequently constructed. By way of example, the electronic device may consider a time, a current location of the electronic device, an amount of ambient light surrounding the electronic device, an amount of motion of the electronic device, and/or a volume level of ambient sounds.

Figure 2:
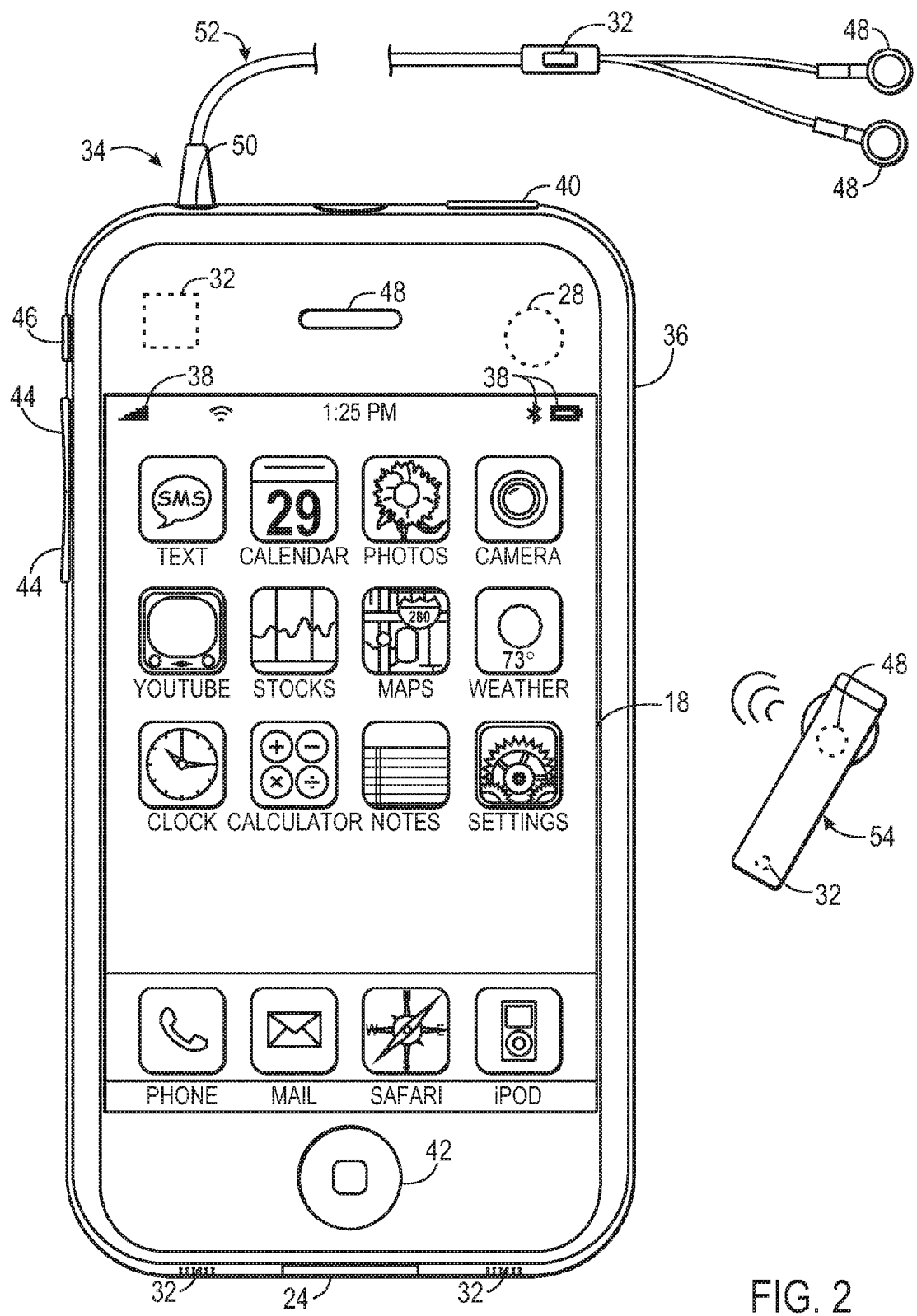
FIG. 2 is a schematic view of a handheld device representing one embodiment of the electronic device of FIG. 1.

A general description of suitable electronic devices for performing the presently disclosed techniques is provided below. In particular, FIG. 1 is a block diagram depicting various components that may be present in an electronic device suitable for use with the present techniques. FIG. 2 represents one example of a suitable electronic device, which may be, as illustrated, a handheld electronic device having image capture circuitry, motion-sensing circuitry, and video processing capabilities.

Turning first to FIG. 1, an electronic device 10 for performing the presently disclosed techniques may include, among other things, a central processing unit (CPU) 12 and/or other processors, memory 14, nonvolatile storage 16, a display 18, an internal clock 20, location-sensing circuitry 22, an input/output (I/O) interface 24, network interfaces 26, image capture circuitry 28, accelerometers/magnetometer 30, and a microphone 32. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10.

By way of example, the electronic device 10 may represent a block diagram of the handheld device depicted in FIG. 2 or similar devices. Additionally or alternatively, the electronic device 10 may represent a system of electronic devices with certain characteristics. For example, a first electronic device may include at least a microphone 32, which may provide audio to a second electronic device including the CPU 12 and other data processing circuitry. It should be noted that the data processing circuitry may be embodied wholly or in part as software, firmware, hardware or any combination thereof. Furthermore the data processing circuitry may be a single contained processing module or may be incorporated wholly or partially within any of the other elements within electronic device 10. The data processing circuitry may also be partially embodied within electronic device 10 and partially embodied within another electronic device wired or wirelessly connected to device 10. Finally, the data processing circuitry may be wholly implemented within another device wired or wirelessly connected to device 10. As a non-limiting example, data processing circuitry might be embodied within a headset in connection with device 10.

In the electronic device 10 of FIG. 1, the CPU 12 and/or other data processing circuitry may be operably coupled with the memory 14 and the nonvolatile memory 16 to perform various algorithms for carrying out the presently disclosed techniques. Such programs or instructions executed by the processor(s) 12 may be stored in any suitable manufacture that includes one or more tangible, computer-readable media at least collectively storing the instructions or routines, such as the memory 14 and the nonvolatile storage 16. Also, programs (e.g., an operating system) encoded on such a computer program product may also include instructions that may be executed by the processor(s) 12 to enable the electronic device 10 to provide various functionalities, including those described herein. The display 18 may be a touch-screen display, which may enable users to interact with a user interface of the electronic device 10. The internal clock 20 may track time and/or date. The location-sensing circuitry 22 may represent device capabilities for determining the relative or absolute location of electronic device 10. By way of example, the location-sensing circuitry 22 may represent Global Positioning System (GPS) circuitry, algorithms for estimating location based on proximate wireless networks, such as local Wi-Fi networks, and so forth.

The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G cellular network. Through the network interfaces 26, the electronic device 10 may interface with a wireless headset that includes a microphone 32. The image capture circuitry 28 may enable image and/or video capture, and the accelerometers/magnetometer 30 may observe the movement and/or a relative orientation of the electronic device 10.

When employed in connection with a voice-related feature of the electronic device 10, such as a voice recognition software application, the microphone 32 may obtain an audio signal of a user's voice and other ambient sounds. The CPU 12 may process the audio signal to exclude most ambient sounds using a previously-determined noise profile. As described in greater detail below, the noise profile may be determined prior to the activation of the voice-related feature of the electronic device 10, based on a recording of the ambient sounds. Although the microphone 32 generally may be inactive, the microphone 32 may periodically awaken, or may awaken after a stimulus, to record the ambient sounds when the user is not speaking.

FIG. 2 depicts a handheld device 34, which represents one embodiment of electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 34 may include an enclosure 36 to protect interior components from physical damage and to shield them from electromagnetic interference. The enclosure 36 may surround the display 18, which may display indicator icons 38. Such indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices. As indicated in FIG. 2, the reverse side of the handheld device 34 may include the image capture circuitry 28 and, in certain embodiments, an outward-facing microphone 32. As described below, the outward-facing microphone 32 may be used to capture audio of ambient sounds even while the handheld device 34 is in use.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. The microphones 32 may obtain a user's voice for various voice-related features, and a speaker 48 may enable audio playback and/or certain phone capabilities. Headphone input 50 may provide a connection to external speakers and/or headphones.

As illustrated in FIG. 2, a wired headset 52 may connect to the handheld device 34 via the headphone input 50. The wired headset 52 may include two speakers 48 and a microphone 32. The microphone 32 may enable a user to speak into the handheld device 34 in the same manner as the microphones 32 located on the handheld device 34. In some embodiments, a button near the microphone 32 may cause the microphone 32 to awaken and/or may cause a voice-related feature of the handheld device 34 to activate. A wireless headset 54 may similarly connect to the handheld device 34 via a wireless interface (e.g., a Bluetooth interface) of the network interfaces 26. Like the wired headset 52, the wireless headset 54 may also include a speaker 48 and a microphone 32. Also, in some embodiments, a button near the microphone 32 may cause the microphone 32 to awaken and/or may cause a voice-related feature of the handheld device 34 to activate. Additionally or alternatively, a standalone microphone 32 (not shown), which may lack an integrated speaker 48, may interface with the handheld device 34 via the headphone input 50 or via one of the network interfaces 26.

Figure 3:
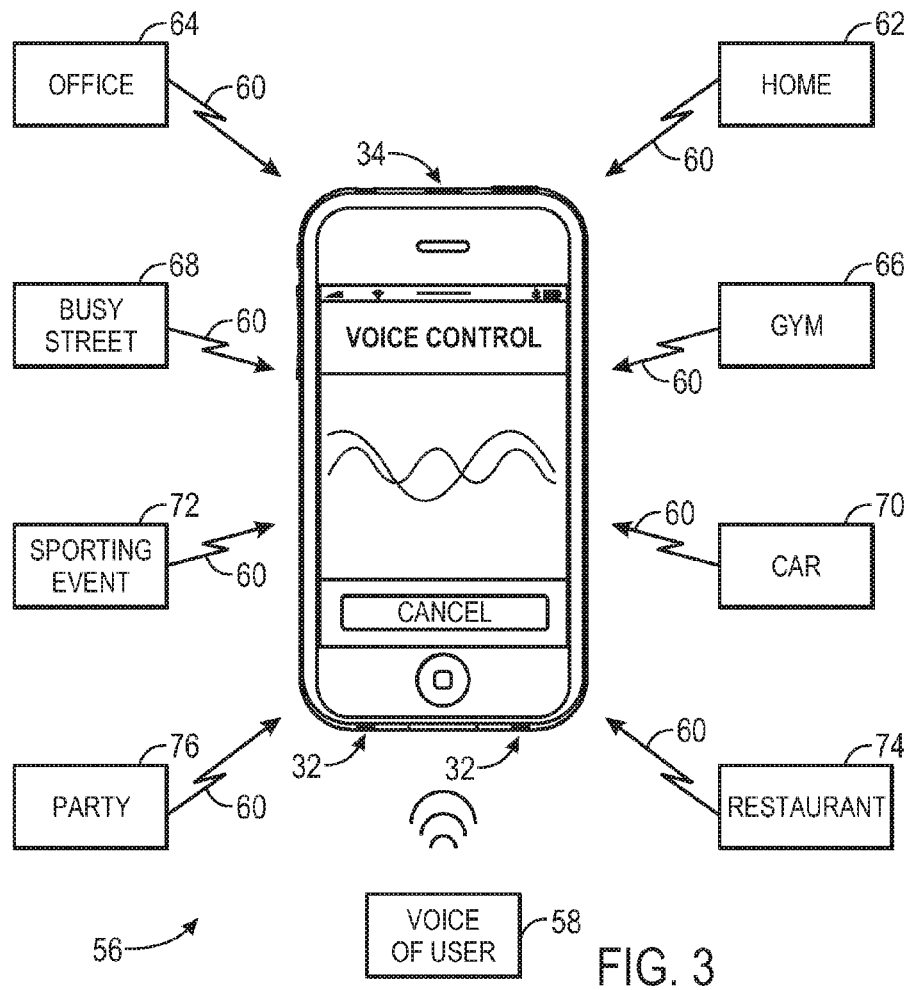
FIG. 3 is a schematic block diagram representing various contexts in which a voice-related feature of the electronic device of FIG. 1 may be used, in accordance with an embodiment.

A user may use a voice-related feature of the electronic device 10, such as a voice-recognition feature, in a variety of contexts. FIG. 3 illustrates many such contexts 56 in which the electronic device 10, depicted as the handheld device 34, may receive a voice audio signal 58 from the user and ambient sounds 60 while performing a voice-related feature. By way of example, the voice-related feature of the electronic device 10 may include, for example, a voice recognition feature, a voice note recording feature, a video recording feature, and/or a telephone feature. The voice-related feature may be implemented on the electronic device 10 in software carried out by the CPU 12 or other processors, and/or may be implemented in specialized hardware.

To activate the voice-related feature on the electronic device 10, the user may navigate to an icon representing the voice-related feature or may press one or more of the input structures 40-46. For example, to activate a voice-recognition feature of the handheld device 34, the user may press down the input structure 42 for approximately two seconds. Thereafter, the user may speak the voice audio signal 58, which may enter the microphone 32 of the electronic device 10. At approximately the same time, however, ambient sounds 60 may also enter the microphone 32. Based on a previously-determined noise profile, the electronic device 10 may filter away the ambient sounds 60 such that the voice audio signal 58 is largely free of such noise.

The ambient sounds 60 may vary depending on the context 56 in which the electronic device 10 is being used. The various contexts 56 in which the voice-related feature may be used may include at home 62, in the office 64, at the gym 66, on a busy street 68, in a car 70, at a sporting event 72, at a restaurant 74, and at a party 76, among others. As should be appreciated, the typical ambient sounds 60 that occur on a busy street 68 may differ greatly from the typical ambient sounds 60 that occur at home 62 or in a car 70.

Because the character of the ambient sounds 60 may vary from context 56 to context 56, a single generic noise profile may not effectively eliminate the ambient sounds 60 in all of the contexts 56. Rather, as described in greater detail below, the electronic device 10 may filter the ambient sounds 60 using a noise profile determined from a prior recording of the ambient sounds 60 that occurs before the user activates the voice-related feature of the electronic device 10. Additionally, each of the contexts 56 may occur at certain locations and times, with varying amounts of electronic device 10 motion and ambient light, and/or with various volume levels of the voice signal 58 and the ambient sounds 60. As such, in some embodiments, the electronic device 10 may filter the ambient sounds 60 using a noise profile previously determined in a similar context 56 based on the time, location, motion, ambient light, and/or volume level.

Figure 4:
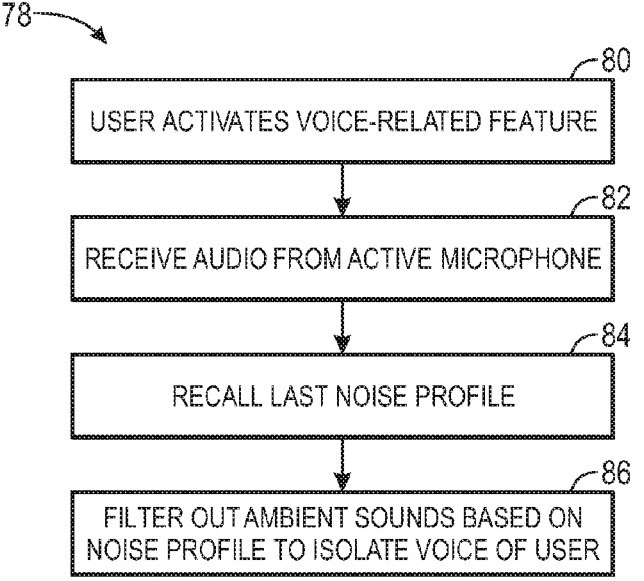
FIG. 4 is a flowchart representing an embodiment of a method for performing noise cancellation for a voice-related feature.

FIG. 4 is a flowchart 78 representing an embodiment of a method for isolating the voice audio signal 58 from the ambient sounds 60 when a voice-related feature of the electronic device 10 is used. In a first step 80, a user may activate the voice-related feature of the electronic device 10. Depending on the configuration of the electronic device 10, step 80 may include navigating to a voice-related feature icon, holding down the button 42, or pressing or holding a button on the wired headset 52 or wireless headset 54.

In step 82, the electronic device 10 may receive audio from the microphone 32 that is currently active. The active microphone 32 may be located, for example, on the handheld device 34, the wired headset 52, or the wireless headset 54. In step 84, a most-recently-determined noise profile may be recalled from the memory 14 or nonvolatile storage 16. This noise profile may represent a noise profile determined based on a recent observation of the ambient sounds 60 prior to the activation of the voice-related feature in step 80.

In step 86, the ambient sounds 60 may be filtered out of the audio obtained in step 82, substantially isolating the voice audio signal 58. Thereafter, the voice audio signal 58 may be employed by the voice-related feature. By way of example, when the voice-related feature is a voice recognition feature, the electronic device 10 typically may subsequently analyze the voice audio signal 58 to ascertain a voice command. When the voice-related feature is a voice note recording feature, voice notes may be recorded with reduced background noise.

FIG. 5 is a flow diagram 92 that illustrates a manner of performing the method of FIG. 4. As shown in the flow diagram 92, the active microphone 32 may receive the voice audio signal 58 as well as the ambient sounds 60. The active microphone 32 and/or related circuitry may, in some embodiments, digitize and/or compress the obtained audio to produce a digital audio signal 94. A filter 97, which may be implemented using hardware, software, firmware, or a combination thereof, and which may include the CPU 12 and/or other processors, may receive the digital audio signal 94. Based on a noise profile 96 received from memory 14 and/or the nonvolatile storage 16, the filter 97 may filter the ambient sounds 60 out of the digital audio signal 94. When the ambient sounds 60 have been at least partially filtered from the digital audio signal 94, an isolated voice signal 98 may result.

Figure 6:
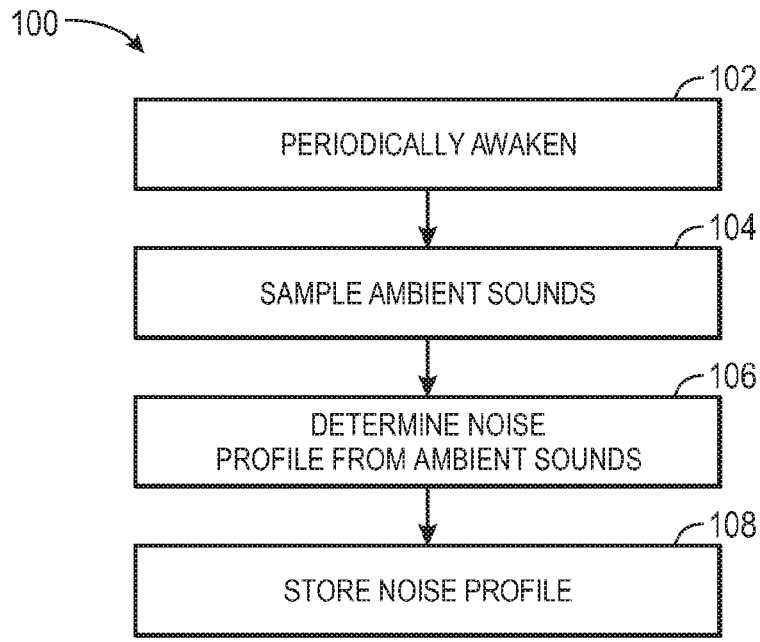
FIG. 6 is a flowchart representing an embodiment of a method for periodically determining a noise profile for use with a voice-related feature.

Because a generic noise profile may not sufficiently isolate the ambient sounds 60 found in the various contexts 56 in which voice-related features may be used, and because determining the noise profile after a voice-related feature has been activated, the electronic device 10 may periodically determine the noise profile by sampling the ambient sounds 60 when the voice-related feature is not in use and/or using the outward-facing microphone 32. A flowchart 100, illustrated in FIG. 6, represents an embodiment of such a method for periodically determining a current noise profile 96. First step 102 may occur while a voice-related feature is not currently in use, or may involve the use of an outward-facing microphone 32 of the electronic device 10, such that the microphone 32 will less likely pick up sounds of the user's voice and will more likely pick up ambient sounds 60. In step 102, the electronic device 10 may periodically awaken a microphone 32 on the electronic device 10, the wired headset 52, or the wireless headset 54 after a period of inactivity. As described below with reference to FIG. 8, the length of the period of inactivity of the microphone 32, occurring prior to step 102, may vary depending on a variety of factors. By way of example, the period of inactivity may be chosen such that the microphone 32 is activated every 5 seconds, 10 seconds, 20 seconds, 30 seconds, 1 minute, 2 minutes, 5 minutes, 10 minutes, 20 minutes, 30 minutes, 1 hour, or 2 hours, and so forth.

In step 104, the active microphone 32 may obtain ambient sounds by sampling the ambient sounds 60 for a period of time. As described below with reference to FIG. 9, the length of the sampling period may vary depending on a variety of factors. By way of example, the sampling period may be chosen such that the ambient sounds 60 are sampled for 1 second, 2 seconds, 5 seconds, 10 seconds, 20 seconds, or 30 seconds, 1 minute and so forth. The ambient sounds 60 sampled in step 104 may provide a basis for determining, in step 106, a current noise profile 96. The determination of the noise profile 96 of step 106 may take place in the electronic device 10 using any noise convergence technique, such that the determined current noise profile 96 may later be used to filter out ambient sounds 60, in the manners described above with reference to FIGS. 4 and 5. In step 108, the electronic device 10 may optionally store the newly determined noise profile 96 in memory 14 or nonvolatile storage 16.

A flow diagram 110, representing a manner of performing the method of FIG. 6, is illustrated in FIG. 7. In the flow diagram 110, when the electronic device 10 periodically awakens the active microphone 32 when a voice-related feature is not in use, or when the active microphone 32 is an outward-facing microphone 32, primarily only ambient sounds 60 may be picked up in the microphone 32 to form the audio signal 94. The CPU 12 and/or any suitable data processing circuitry of the electronic device 10 may receive the digital audio signal 94, converging the ambient sounds 60 of the digital audio signal 94 to a noise profile 96 that may later be used to filter out the recently-obtained ambient sounds 60. The noise profile 96 may be stored in memory 14 or nonvolatile storage 16.

Figure 8:
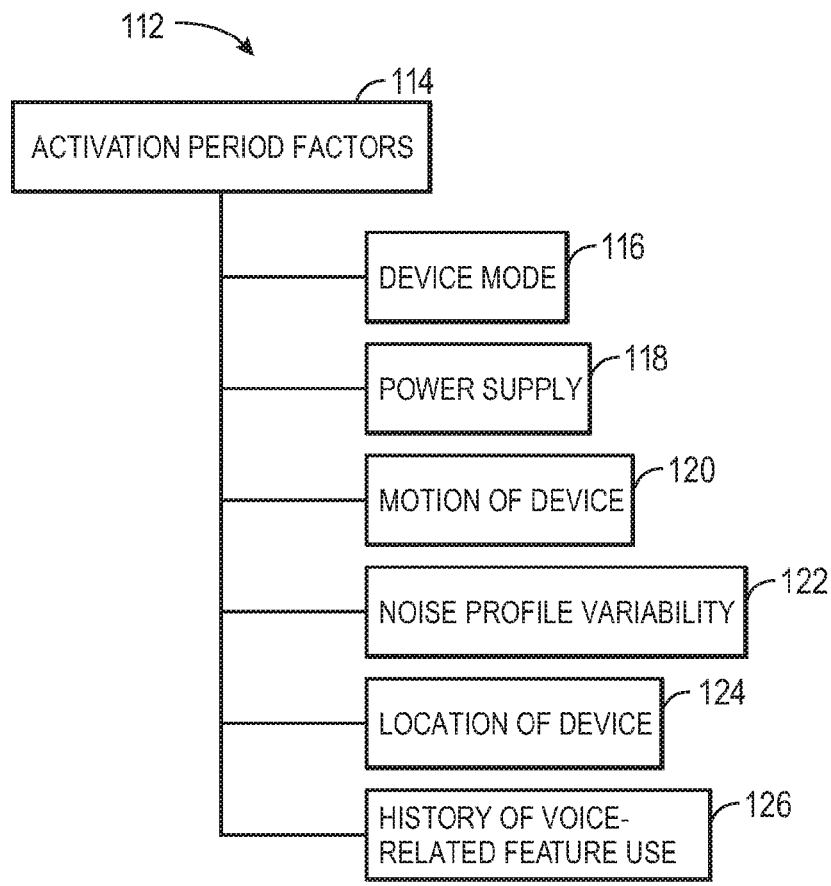
FIG. 8 is a schematic diagram representing various factors for determining the periodicity of the method of FIG. 6, in accordance with an embodiment.

As mentioned above with reference to the flowchart 100 of FIG. 6, the microphone 32 may not remain active at all times, but rather may activate after a period of inactivity to conserve resources of the electronic device 10. FIG. 8 illustrates a schematic diagram 112 representing various activation period factors 114 for determining the period of inactivity between times in which the microphone 32 may be activated. Based on one or more of the activation period factors 114, the electronic device 10 may determine the period of inactivity at the time the current noise profile 96 is determined, every few times the current noise profile 96 is determined, or at other times. In general, the activation period factors 114 may balance how likely a voice-related feature is to be activated by a user and the use of resources for determining the noise profile 96 for the voice-related feature.

A first factor 116 of the activation period factors 114 may be a current mode of the electronic device 10. By way of example, the electronic device 10 may be actively in use, may be inactive or in a sleep mode, and/or may be operating in a mode with reduced functionality, such as "airplane mode." The factor 116 may weigh in favor of a shorter period of inactivity if the electronic device 10 is actively in use, and a voice-related feature is thus more likely to be activated by the user. The factor 116 may weigh in favor of a longer period of inactivity if the electronic device 10 is inactive or operating in a mode of reduced functionality.

A second factor 118 of the activation period factors 114 may be a current state of a power supply of the electronic device 10. By way of example, if the electronic device 10 is currently being charged, a user may be less likely to use a voice-related feature of the electronic device 10. Under such conditions, the factor 118 may weigh in favor of a longer period of inactivity. Alternatively, because the electronic device 10 may effectively have an unlimited supply of power, the factor 118 may instead weigh in favor of a shorter period of inactivity.

When the electronic device 10 is not currently being charged, the amount of remaining battery life may be considered. For example, when the battery life of the electronic device 10 remains high, the factor 118 may weigh in favor of a relatively shorter period of inactivity because the additional power needed to activate the microphone and to determine the noise profile may be justified. When the battery life of the electronic device 10 is relatively low, the factor 118 may weigh in favor of a relatively longer period of inactivity to conserve the remaining battery power.

A third factor 120 of the activation period factors 114 may be an amount of recent motion of the electronic device 10, as detected by the accelerometers/magnetometer 30. If very little motion is detected, the factor 120 may weigh in favor of a longer period of inactivity, as the electronic device 10 may have been set down by the user and, accordingly, a voice-related feature of the electronic device 10 may be less likely to be used. On the other hand, if a significant amount of motion is detected, the factor 120 may weigh in favor of a shorter period of inactivity, as the electronic device 10 is likely being carried by the user and, accordingly, a voice-related feature of the electronic device 10 may be more likely to be used.

A fourth factor 122 of the activation period factors 114 may be the variability of recently-determined noise profiles 96. Specifically, if a recently determined noise profile 96 is very similar to previously-determined noise profiles 96, further noise profiles 96 that are subsequently determined may likely provide little benefit over the previously-determined noise profiles 96. Under such conditions, the factor 122 may weigh in favor of a longer period inactivity, because additional sampling by the microphone 32 may be less likely to obtain ambient sounds 60 that would produce a significantly different noise profile 96. If recently-determined noise profiles 96 vary greatly, however, the factor 122 may weigh in favor of a shorter period of inactivity.

A fifth factor 124 of the activation period factors 114 may be the current location of the electronic device 10. If the user has previously used, or frequently uses, a voice-related feature of the electronic device 10 at the current location (e.g., at home), as determined by the location-sensing circuitry 22 or based on a wireless network currently visible to the network interfaces 26, the factor 124 may weigh in favor of a shorter period of inactivity. If not, the factor 124 may weigh in favor of a longer period of inactivity.

Similarly, a sixth factor 126 of the activation period factors 114 may be a history of voice-related feature use on the electronic device 10. By way of example, based on the history of use of the voice-related feature, the factor 126 may weigh in favor of a shorter period of inactivity at times of the day when the voice-related feature of the electronic device 10 is frequently used. The factor 126 may weigh in favor of a longer period of inactivity at times of the day when the voice-related feature is rarely used.

Figure 9:
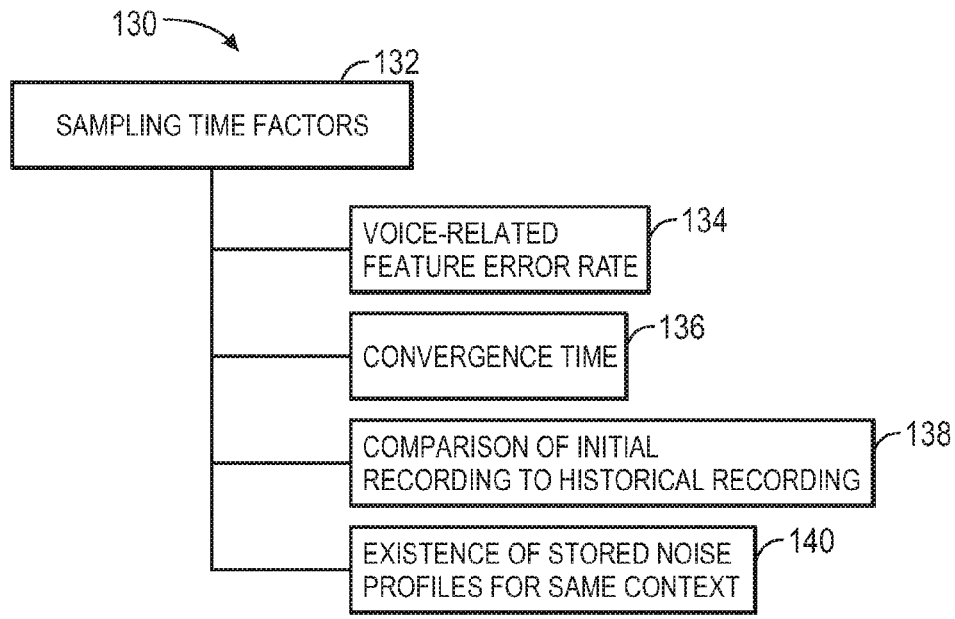
FIG. 9 is a schematic diagram representing various factors for determining a sampling time for use with the method FIG. 6, in accordance with an embodiment.

As noted above, the period of time in which the microphone 32 may sample the ambient sounds 60 in step 104 of the flowchart 100 may vary. The particular length of the sampling period may vary depending on a variety of factors, as illustrated in FIG. 9. In FIG. 9, a schematic diagram 130 represents several sampling time factors 132. The sampling time factors 132 may be used by the electronic device 10 to determine the sampling time at the time the noise profile 96 is determined, every few times the noise profile 96 is determined, or at other times. In general, the sampling time factors 132 may balance how likely a voice-related feature is to be activated by a user and the use of resources for determining the noise profile 96 for the voice-related feature.

A first factor 134 of the sampling time factors 132 may be an error rate that occurs when a voice-related feature is used. Certain voice-related features, such as voice-recognition features, may incorrectly identify a voice signal 98 if the ambient sounds 60 are not sufficiently filtered during noise cancellation. The error rate of such a voice-related feature may be stored and considered as the factor 134. As such, the factor 134 may weigh in favor of a longer sampling time as the error rate increases.

A second factor 136 of the sampling time factors 132 may be an amount of time required to converge the ambient sounds 60 in the digital audio signal 94 to obtain the noise profile 96. The factor 136 may weigh in favor of a sampling time that corresponds, longer or shorter, with recent convergence times.

A third factor 138 of the sampling time factors 132 may be a comparison of the digital audio signal 94 from the active microphone 32 to prior recordings of the ambient sounds 60 or a prior noise profile 96. By way of example, the factor 138 may weigh in favor of a shorter sampling time if the digital audio signal 94 appears to be very similar to previously-recorded ambient sounds 60 or prior noise profiles 96. In other words, if newly recorded ambient sounds 60 would simply result in a very similar noise profile 96, the sampling time 132 may be reduced or cut short.

A fourth factor 140 of the sampling time factors 132 may relate to whether other noise profiles 96 have been stored, which were previously obtained in the same or similar context 56 in which the electronic device is currently being used. As described below with reference to FIGS. 10-13, certain embodiments of the techniques disclosed herein may involve observing and storing information relating to a current context 56 of use of the electronic device 10 with noise profiles 96 as they are determined. The factor 140 may weigh in favor of a shorter sampling time when other noise profiles 96 have already been obtained from a similar context 56.

Figure 10:
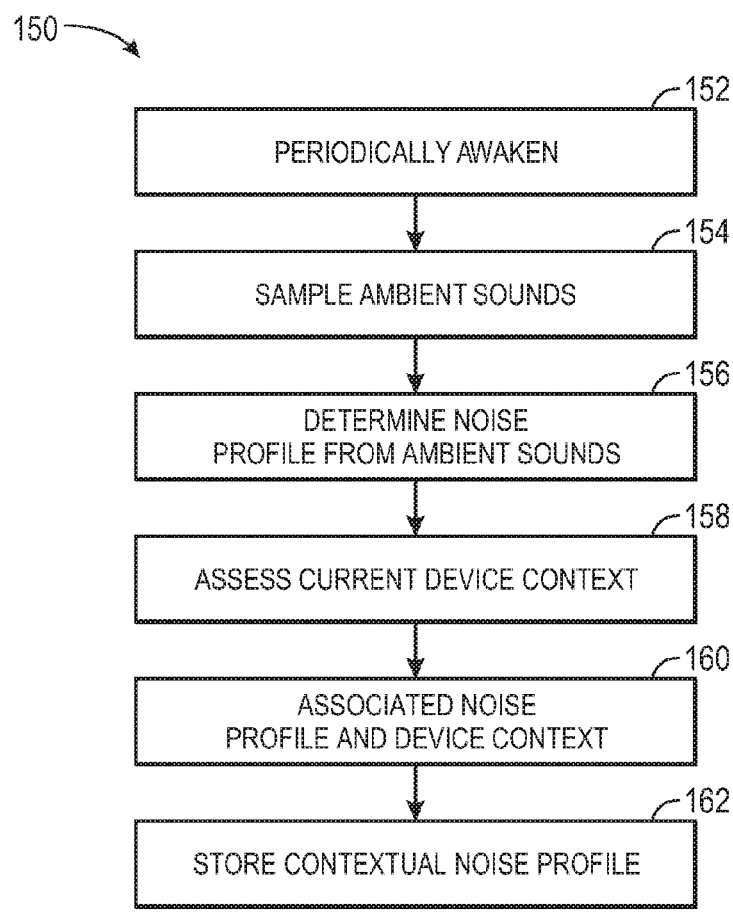
FIG. 10 is a flowchart representing an embodiment of a method for periodically determining a contextual noise profile.

FIGS. 10-13 relate to manners of determining a contextual noise profile and, at a later time, using the contextual noise profile in the proper context 56. Turning first to FIG. 10, a flowchart 150 represents an embodiment of a method for periodically determining a contextual noise profile. Steps 152-156 may be performed at substantially the same manner of steps 102-106 of the flowchart 100 of FIG. 6. Thus, after step 156, a noise profile may be determined based on the ambient sounds 60.

In step 158, the electronic device 10 may determine its current context of use by ascertaining the time, the location, amount of ambient light, amount of motion, and/or volume of ambient sounds 60 currently associated with the electronic device 10. In some embodiments, more or fewer such indicators of the current context 56 may be considered. In step 160, the noise profile determined in step 156 and the contextual indicators assessed in step 158 may be associated. This may result in a contextual noise profile that may be identified for later use when the electronic device 10 is in the same or a similar context 56. In step 162, the contextual noise profile may be stored in memory 14 or nonvolatile storage 16.

Figure 11:
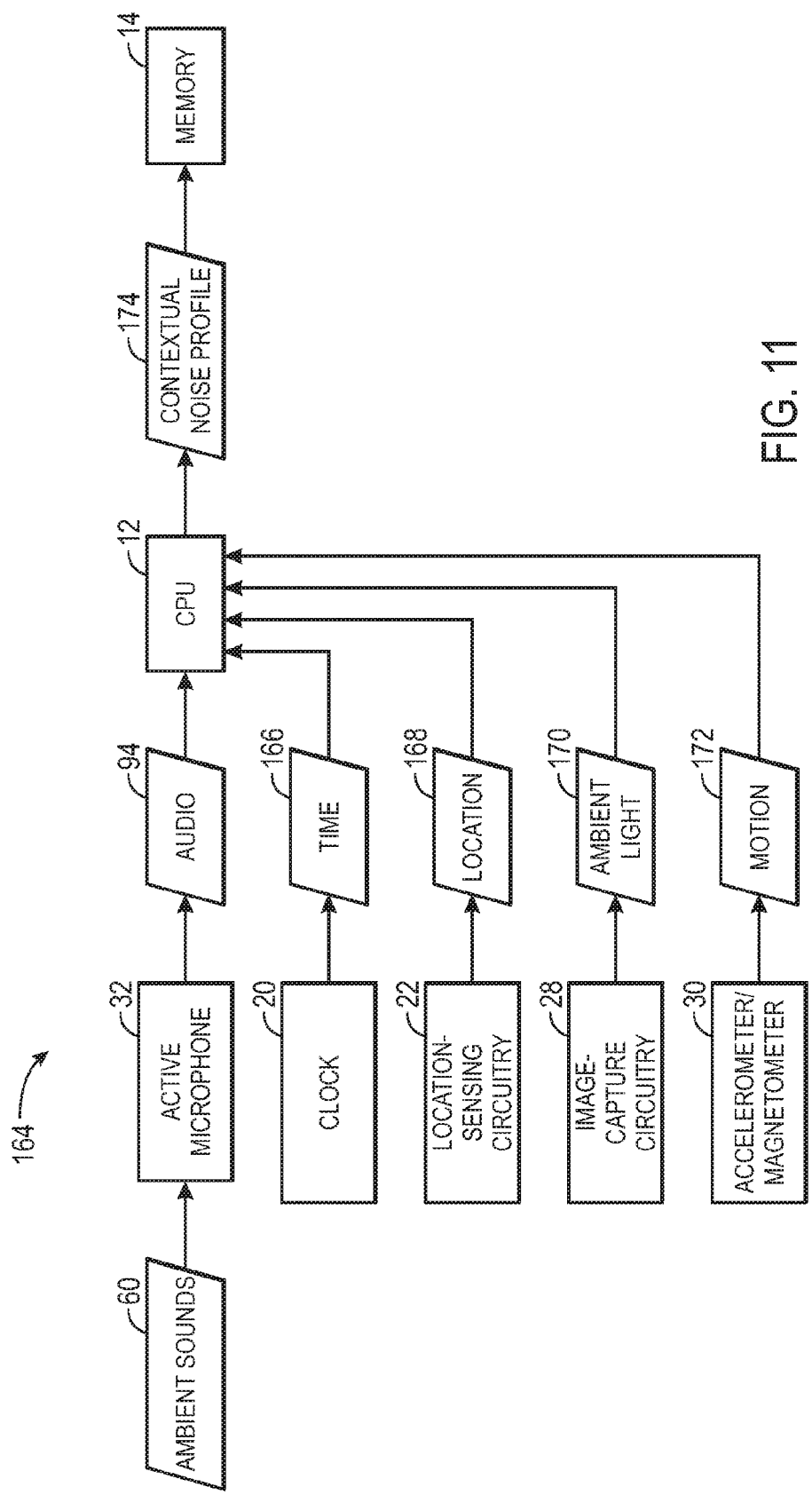
FIG. 11 is a flow diagram representing a manner of performing the method of FIG. 10, in accordance with an embodiment.

FIG. 11 is a flow diagram 164 representing a manner of performing the method of FIG. 10. As shown in the flow diagram 164, ambient sounds 60 may be periodically detected by the active microphone 32 and converted to a digital audio signal 94. A data processing unit such as CPU 12 may use the digital audio signal 94 to determine a noise profile associated with the ambient sounds 60. Additionally, the CPU 12 may receive a time signal 166 from the clock 20, a location signal 168 from the location-sensing circuitry 22, an ambient light signal 170 from the image-capture circuitry 28, and/or a motion and/or orientation signal 172 from the accelerometer/magnetometer 30. The signals 166-172, as well as a determination of the volume level of the digital audio signal 94, may relate to a current context of use of the electronic device 10. Since the various contexts 56 in which the electronic device may be used may have recognizable times, locations, ambient amounts of light, amounts of motion, and volume levels, the signals 166-172 may enable the CPU 12 to create a contextual noise profile 174 that generally may represent the ambient sounds 60 found at other similar times, locations, ambient amounts of light, amounts of motion, and volume levels. By way of example, a user may commute from home to work each day in a car between 8:00 and 9:00 AM. A contextual noise profile 174 obtained one day at this time likely may represent ambient sounds 60 that may occur during another day at the same time. Thereafter, the contextual noise profile 174 may be stored in memory 14 and/or nonvolatile storage 16. In some embodiments, the contextual noise profile 174 may be stored in a database or similar data structure.

At a later time, the contextual noise profile 174 may be used for noise-cancellation when a user activates a voice-related feature in a similar context 56, as described in a flowchart 176 of FIG. 12. In the flowchart 176, steps 178 and 180 may be substantially the same as steps 80 and 82 of the flowchart 78 of FIG. 4. In step 182, the electronic device 10 may assess the current context 56 of the electronic device by ascertaining the current time, location, ambient amount of light, amount of motion, and/or the volume of ambient sounds 60 in the digital audio signal 94. In step 184, the electronic device 10 may select a contextual noise profile 174 that matches the current context 56 ascertained in step 182. In step 186, the electronic device 10 may filter away the ambient sounds 60 based on the contextual noise profile to isolate the user's voice.

Figure 12:
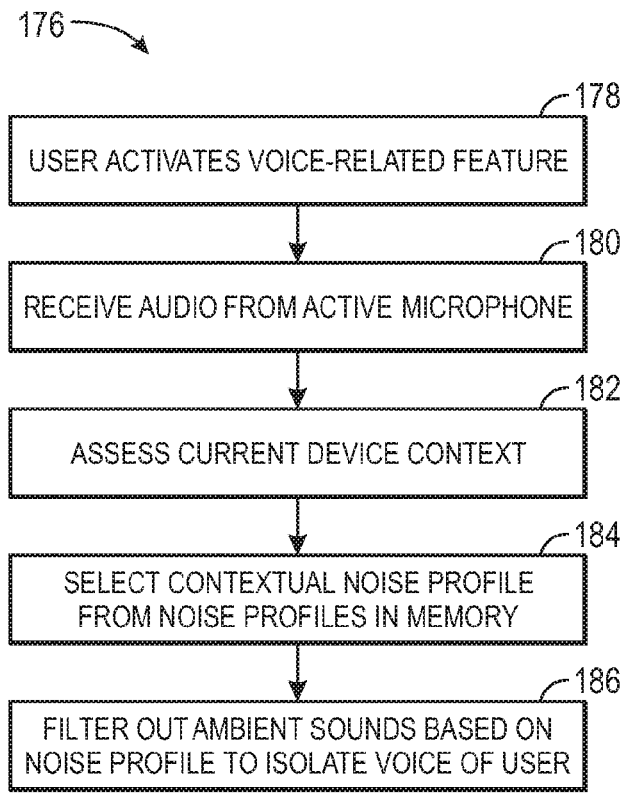
FIG. 12 is a flowchart of an embodiment of a method for performing contextual noise cancellation for a voice-related feature, in accordance with an embodiment.
Figure 13:
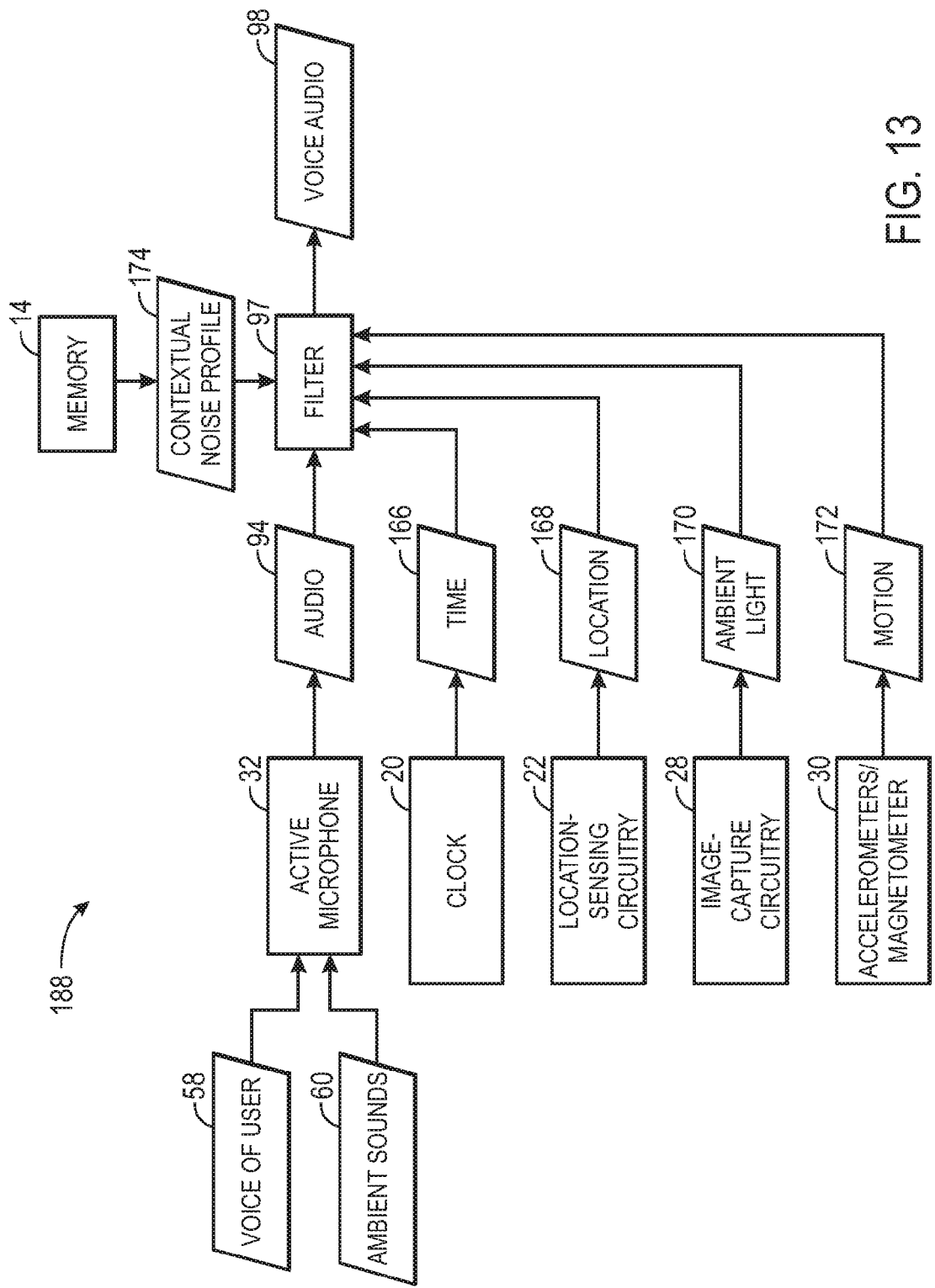
FIG. 13 is a flow diagram representing a manner of performing the method of FIG. 12, in accordance with an embodiment.

FIG. 13 is a flow diagram 188 illustrating a manner of performing the method described in FIG. 12. As shown in the flow diagram 188, when a user elects to use a voice-related feature, the active microphone 32 may take in the voice audio signal 58 along with various ambient sounds 60. The ambient sounds 60 may be converted into an audio signal 94 and transmitted to the filter 97, which may be implemented using hardware, software, firmware, or a combination thereof, and which may include the CPU 12 and/or other processors. Additionally, the filter 97 may receive a time signal 166 from the clock 20, a location signal 168 from the location-sensing circuitry 22, and ambient light signal 170, from the image capture circuitry 28, and a motion signal 172 from the accelerometer/magnetometer 30. Based on the signals 166-172, as well as the volume of the digital audio signal 94, the filter 97 may select a contextual noise profile 174 from the memory 14 or nonvolatile storage 16 that corresponds to a similar context of use 56. To continue with the example mentioned above, if a user commutes from home to work each day in a car between 8:00 and 9:00 AM, and the time is currently 8:30 AM, the filter 97 may select a contextual noise profile 174 previously obtained around the same time, and therefore likely when the user was commuting to work. Using the contextual noise profile 174, the filter 97 may filter out the ambient sounds 60 from the audio signal 94, producing a voice audio signal 98.

As described above, a noise profile 96 and/or 174 may be determined on a periodic basis, before a user activates a voice-related feature of the electronic device 10 and/or using an outward-facing microphone 32. However, as described below with reference to FIGS. 14-20, noise profiles 96 and/or 174 may be determined, additionally or alternatively, in response to certain other stimuli. Such stimuli may include when a user activates a non-voice-related feature, when the electronic device 10 initializes, while a user navigates to a voice-related feature, when the electronic device 10 senses a change in context, and/or while a user is using a telephone feature of the electronic device 10.

Figure 14:
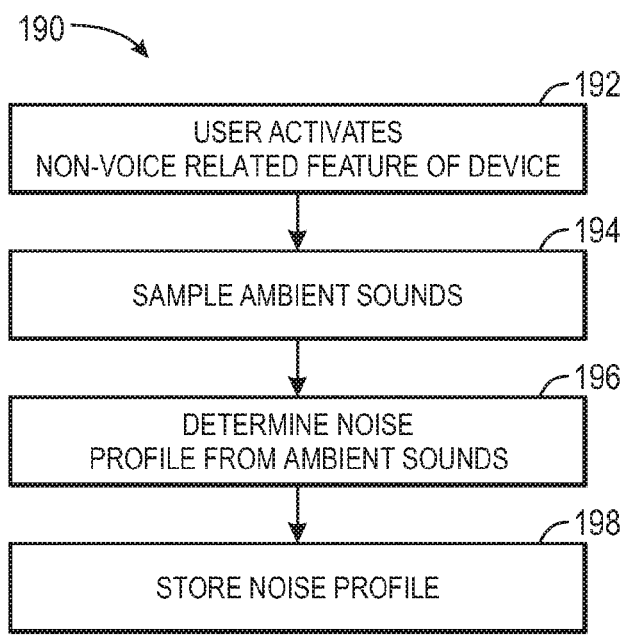
FIGS. 14-20 are flowcharts representing embodiments of methods for determining noise profiles due to irregular stimuli.

FIG. 14 is a flowchart 190 representing an embodiment of a method for determining a noise profile 96 or 174 on an irregular, non-periodical basis. Specifically, in a first step 192, the user may elect to use a non-voice-related feature of the electronic device 10. By way of example, the non-voice-related feature may be a web browser, a game, or other such feature. The act of starting or using the feature may serve as a stimulus that causes the electronic device 10 to begin determining a noise profile 96 or 174. Thus, steps 194-198 may be performed in substantially the same manner as steps 104-108 of FIG. 6 or, alternatively, steps 154-162 of FIG. 10.

Figure 15:
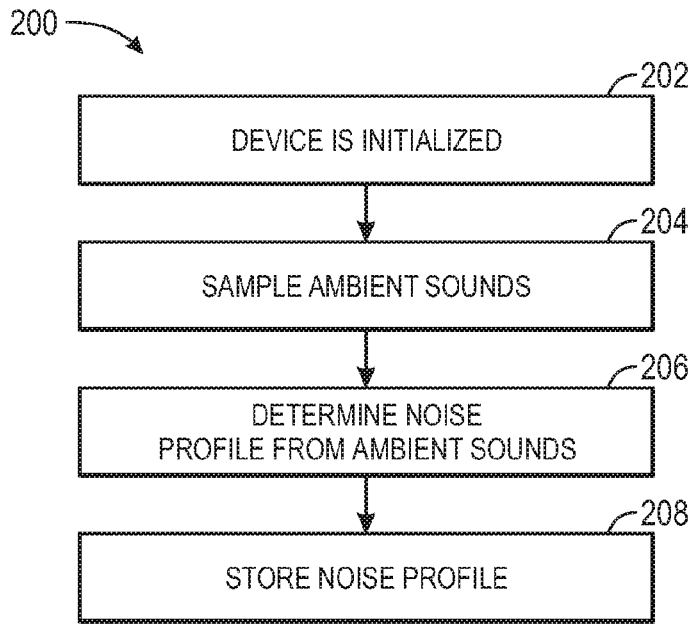

FIG. 15 is a flowchart 200 in which, as illustrated by step 202, the initialization of the electronic device 10 may serve as the stimulus to determine a noise profile 96 and/or 174. By way of example, the electronic device 10 may initialize when the electronic device 10 is turned on or awakens from a sleep mode, is unplugged from being charged, or becomes decoupled from communication with another electronic device. After the electronic device 10 has been initialized in step 202, step 204-208 may involve determining a noise profile 96 in the same manner as steps 104-108 of FIG. 6, or steps 154-162 of FIG. 10.

Figure 16:
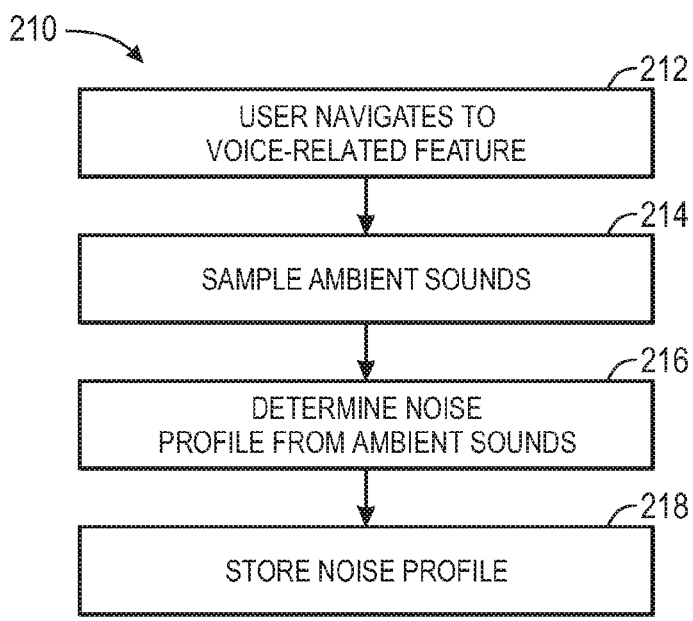

FIG. 16 is a flowchart representing an embodiment of a method in which navigating to a voice-related feature of the electronic device may serve as a stimulus to determine a noise profile 96 and/or 174. As such, in step 212, a user may initially navigate to a voice-related feature. By way of example, a user may navigate to an icon representative of the voice-related feature or may hold the button 42 with the intent to cause the voice-related feature of the electronic device 10 to activate. Step 212 may occur not after the voice-related feature has actually become activated, but rather when the user indicates an intent to activate the voice-related feature. In other words, as soon as the user navigates to a page on which the icon is listed or begins to press the button 42, steps 214-218 may begin, regardless as to the whether the user ultimately chooses to activate the voice-related feature. More generally, step 212 may encompass any action by the user that indicates intent to activate the voice-related feature. Thereafter, steps 214-218 may be performed in substantially the same manner as step 104-108 of FIG. 6 and/or steps 154-162 of FIG. 10.

Figure 17:
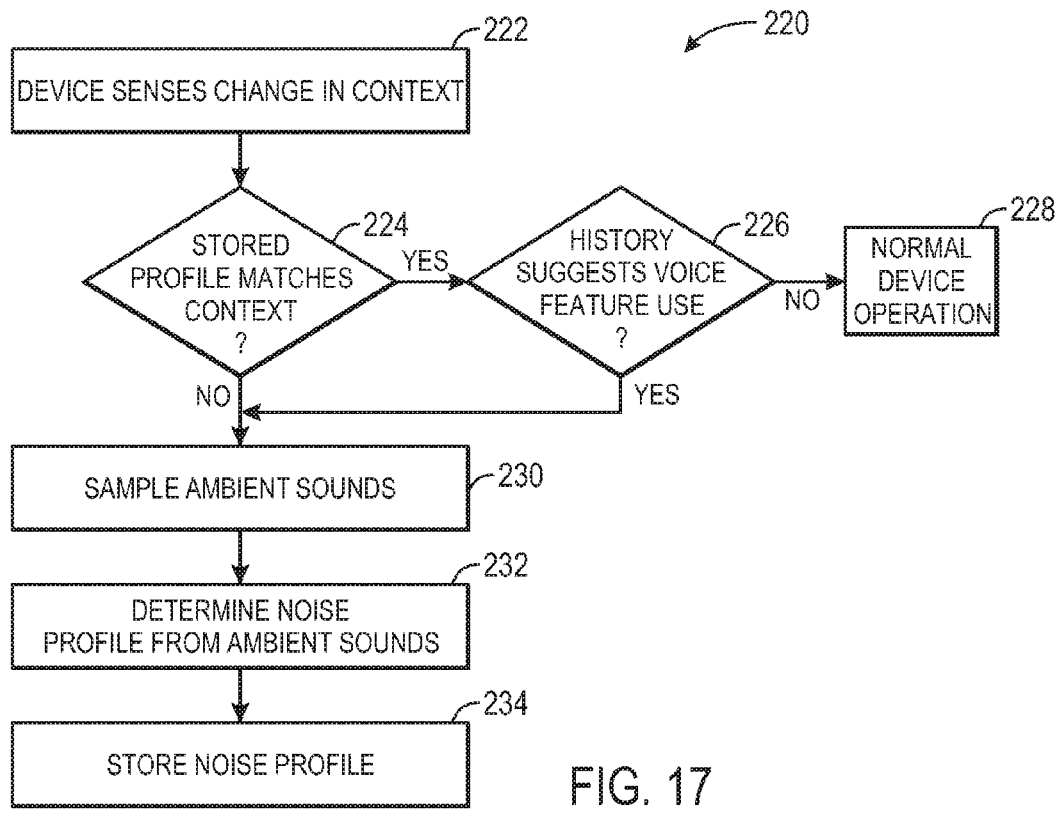

FIG. 17 is a flowchart 220 representing an embodiment of a method in which a change in context 56 may provide a stimulus for determining a noise profile 96 and/or 174. The flowchart 220 may begin when the electronic device 10 senses a change in context 56 in step 222. The change in context 56 may be determined, for example, based on a change in time, location, ambient light, amount of motion, and/or a volume of ambient sounds 60. If, as indicated respectively by decision blocks 224 and 226, a stored noise profile currently matches the new context 56 and a usage history of the voice-related feature does not suggest that the voice-related feature is likely to be used, the process may flow to step 228. In step 228, the electronic device 10 may continue operating normally without determining a noise profile 96 or a contextual noise profile 174.

However, if a stored contextual noise profile 174 does not match the current context, as noted in decision block 224, or if the voice-related feature use history indicates that the voice-related feature is likely to be used, as noted in decision block 226, a new noise profile 96 and/or 174 may be determined. As such, the process may flow to steps 230-234. Steps 230-234 may performed in substantially the same manner as steps 104-108 of FIG. 6 or steps 154-162 of FIG. 10.

Figure 18:
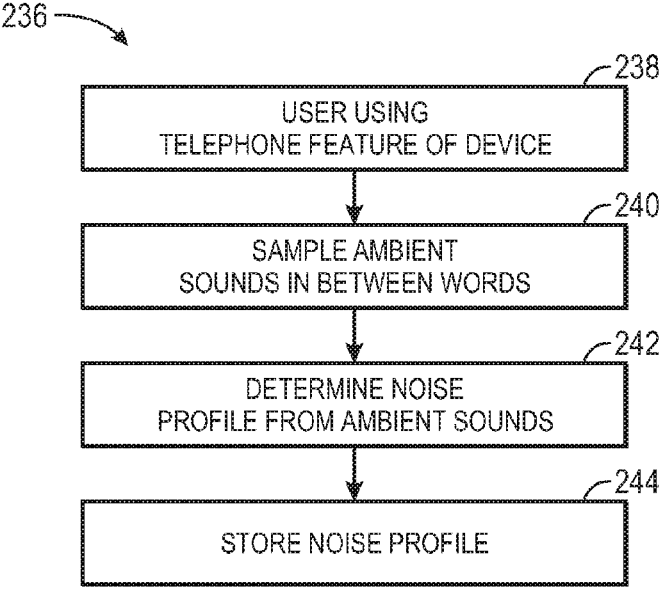
Figure 19:
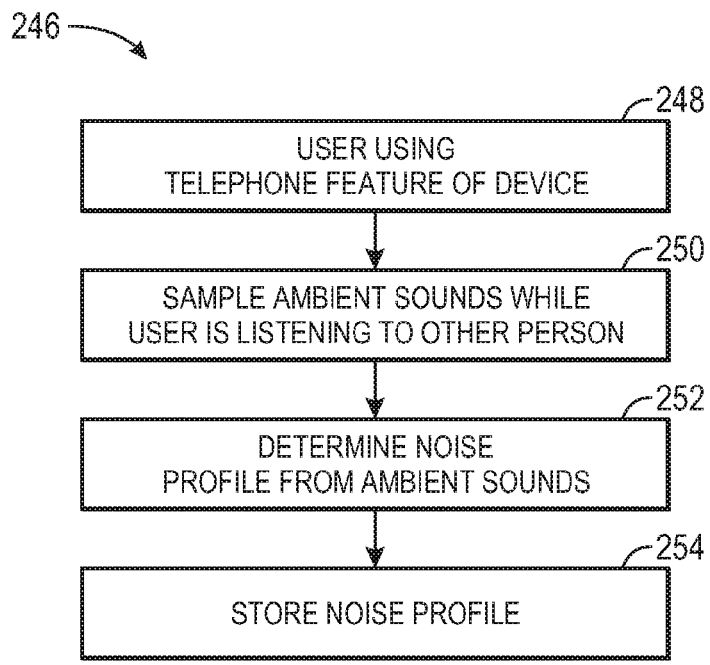
Figure 20:
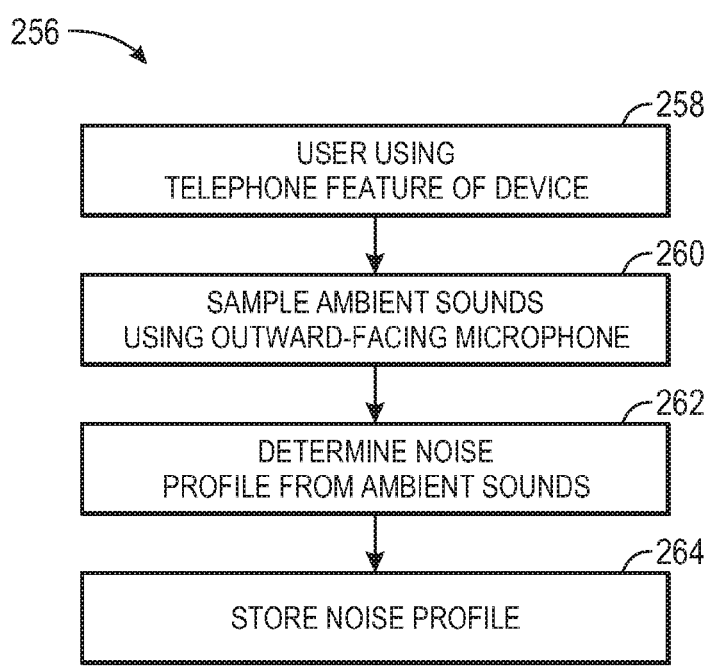

FIGS. 18-20 describe manners of determining a noise profile 96 and/or 174 while a user is using a telephone feature of the electronic device 10. Turning first to FIG. 18, a flowchart 236 may begin with a first step 238, which occurs when a user is using a telephone feature of the electronic device 10. In step 240, a microphone 32 of electronic device 10 may sample the ambient sounds 60 that occur in between the words spoken by the user. Although the microphone 32 may record all sounds, including the user's voice, the user's voice may be louder then the ambient sounds 60 and therefore generally discernable from the ambient sounds. Furthermore, in step 242, the convergence time for determining the noise profile 96 and/or 174 may take a longer time than when the user is not currently speaking. Nevertheless, the determination of the noise profile 96 and/or 174 may be largely transparent to the user, since, unlike a voice-recognition feature, the ambient sounds 60 may not need to be removed immediately. In step 244, the determined noise profile 96 and/or 174 may be stored in memory 14 or the nonvolatile storage 16.

FIG. 19 is a flowchart 246 that similarly may begin, in step 248, when a user is using a telephone feature of the electronic device 10. Specifically, in step 250, the electronic device 10 may sample the ambient sounds 60 near the electronic device 10 at a time when the user is listening to the other person speaking over the telephone. In performing step 250, the electronic device 10 may compare when the microphone 32 produces an audio signal 94 that occurs simultaneously with a received telephone audio signal, which may correspond to a time when the other person is speaking During these times, the user generally may not be speaking and, accordingly, the microphone 32 may primarily detect only ambient sounds 60. Based on the audio signal 94 obtained in step 250, the electronic device 10 may determine a noise profile 96 and/or 174 in step 252, before storing the noise profile 96 and/or 174 in the memory 14 or the nonvolatile storage 16 in step 254.

FIG. 20 is a flowchart 256 that also may begin, in step 258, when a user is using a telephone feature of the electronic device 10. In step 260, the electronic device 10 may obtain a digital audio signal 94 from an active microphone 32, which may be the outward-facing microphone 32 of the handheld device 34 illustrated in FIG. 2. Even while the user is speaking, the outward-facing microphone 32 may record less of the voice audio signal 58 and more of the ambient sounds 60 such that, in step 266, a noise profile 96 and/or 174 may be determined based the ambient sounds 60. In step 264, the noise profile 96 and/or 174 determined in step 262 may be stored in memory 14 or nonvolatile storage 16.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
at a computer system including one or more processors and memory storing one or more programs for execution by the one or more processors, the one or more programs including instructions for:
automatically without human intervention, determining whether a handheld electronic device is not in use;
upon determining that the handheld electronic device is not in use, automatically without human intervention activating a microphone associated with the handheld electronic device;
obtaining ambient sound using the microphone;
determining a first context of use of the handheld electronic device;
determining, at the handheld electronic device, a first noise profile based at least in part on the ambient sound, wherein the first noise profile is configured to enable the handheld electronic device to at least partially filter other ambient sound obtained at a later time when a voice-related feature of the handheld electronic device is in use;
storing the first noise profile in association with the first context of use, wherein the first noise profile is one of a plurality of stored noise profiles each associated with a respective context of use;
receiving an audio signal including voice and background sound;
determining a second context of use of the handheld electronic device;
determining whether the second context of use is substantially similar to the first context of use;
upon determining that the second context of use is substantially similar to the first context of use, selecting the first noise profile; and
using the first noise profile to at least partially filter the background sound from the audio signal to obtain the voice.

2. The method of claim 1, wherein activating the microphone comprises activating the microphone after a period of inactivity, wherein the period of inactivity is determined by the electronic device based at least in part on an operative mode of the electronic device; a state of a power supply of the electronic device; motion of the electronic device; a variability of other noise profiles previously determined; a location of the electronic device; or a usage history of the voice-related feature of the electronic device; or any combination thereof.

3. The method of claim 1, wherein the ambient sound is obtained during a sampling period, wherein the sampling period is determined by the electronic device based at least in part on an error rate of the voice-related feature of the electronic device associated with a noise profile; a convergence time associated with the determination of a noise profile; a comparison of the obtained ambient sound to previously-obtained ambient sound; or whether another noise profile based on other ambient sound obtained in a similar context is stored on the electronic device; or any combination thereof.

4. The method of claim 1, wherein determining the first and the second contexts of use comprises determining a time from a clock of the electronic device; a location from location-sensing circuitry of the electronic device; an amount of ambient light from image-capture circuitry of the electronic device; a motion of the electronic device from motion-sensing circuitry of the electronic device; or a volume of the ambient sound from the microphone; or any combination thereof.

5. The method of claim 1, wherein determining that the handheld electronic device is not in use includes determining that the voice-related feature of the handheld electronic device is not active.

6. The method of claim 1, wherein determining that the handheld electronic device is not in use includes determining that the handheld electronic device is being charged.

7. The method of claim 1, wherein determining that the handheld electronic device is not in use includes determining that the handheld electronic device is not moving.

8. The method of claim 1, wherein the first and the second context of use are defined by at least a location of the handheld electronic device and a time.

9. The method of claim 1, wherein the first and the second context of use are defined by at least a location of the handheld electronic device, a time, and a motion of the handheld electronic device.

10. The method of claim 1, wherein the first and the second context of use are defined by at least a location of the handheld electronic device, a time, an ambient volume level, and a motion of the handheld electronic device.

11. The method of claim 1, wherein the voice-related feature comprises a voice recognition feature; a voice note recording feature; or a video recording feature; or any combination thereof.

12. The method of claim 1, wherein the first and the second context of use are determined at the handheld electronic device.

13. The method of claim 12, wherein the first and the second context of use are determined automatically without human intervention.

14. A system, comprising:
one or more processors;
memory storing one or more programs for execution by the one or more processors, the one or more programs including instructions for:
automatically without human intervention, determining whether a handheld electronic device is not in use;
upon determining that the handheld electronic device is not in use, automatically without human intervention activating a microphone associated with the handheld electronic device;
obtaining ambient sound using the microphone;
determining a first context of use of the handheld electronic device;
determining, at the handheld electronic device, a first noise profile based at least in part on the ambient sound, wherein the first noise profile is configured to enable the handheld electronic device to at least partially filter other ambient sound obtained at a later time when a voice-related feature of the handheld electronic device is in use;

storing the first noise profile in association with the first context of use, wherein the first noise profile is one of a plurality of stored noise profiles each associated with a respective context of use;

receiving an audio signal including voice and background sound;

determining a second context of use of the handheld electronic device;

determining whether the second context of use is substantially similar to the first context of use;

upon determining that the second context of use is substantially similar to the first context of use, selecting the first noise profile; and using the first noise profile to at least partially filter the background sound from the audio signal to obtain the voice.

15. A non-transitory computer-readable storage medium, storing one or more programs for execution by one or more processors of an electronic device, the one or more programs including instructions for:

automatically without human intervention, determining whether a handheld electronic device is not in use;

upon determining that the handheld electronic device is not in use, automatically without human intervention activating a microphone associated with the handheld electronic device;

obtaining ambient sound using the microphone;

determining a first context of use of the handheld electronic device;

determining, at the handheld electronic device, a first noise profile based at least in part on the ambient sound, wherein the first noise profile is configured to enable the handheld electronic device to at least partially filter other ambient sound obtained at a later time when a voice-related feature of the handheld electronic device is in use;

storing the first noise profile in association with the first context of use, wherein the first noise profile is one of a plurality of stored noise profiles each associated with a respective context of use;

receiving an audio signal including voice and background sound;

determining a second context of use of the handheld electronic device;

determining whether the second context of use is substantially similar to the first context of use;

upon determining that the second context of use is substantially similar to the first context of use, selecting the first noise profile; and using the first noise profile to at least partially filter the background sound from the audio signal to obtain the voice.

* * * * *